(12) United States Patent
O'Brien et al.

(10) Patent No.: US 8,365,374 B2
(45) Date of Patent: Feb. 5, 2013

(54) ELASTOMERIC ELEMENT INSTALLATION TOOL AND METHOD

(75) Inventors: Robert S. O'Brien, Katy, TX (US); Gerald D. Lynde, Houston, TX (US); Yang Xu, Houston, TX (US); Thomas Mathew, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1146 days.

(21) Appl. No.: 12/137,860

(22) Filed: Jun. 12, 2008

(65) Prior Publication Data
US 2008/0308284 A1    Dec. 18, 2008

Related U.S. Application Data

(60) Provisional application No. 60/944,170, filed on Jun. 15, 2007.

(51) Int. Cl.
*B23P 19/02* (2006.01)
(52) U.S. Cl. .............................. 29/235; 29/229; 29/451
(58) Field of Classification Search .................. 29/235, 29/229, 451
See application file for complete search history.

(56) References Cited

U.S. PATENT DOCUMENTS

| | | | |
|---|---|---|---|
| 3,946,480 A * | 3/1976 | Dienes ............................ | 29/235 |
| 4,070,746 A | 1/1978 | Evans et al. | |
| 4,410,009 A | 10/1983 | Blum | |
| 4,585,607 A | 4/1986 | Krackeler et al. | |
| 4,868,967 A * | 9/1989 | Holt et al. ....................... | 29/450 |
| 5,030,487 A | 7/1991 | Rosenzweig | |
| 5,226,837 A | 7/1993 | Cinibulk et al. | |
| 5,581,865 A * | 12/1996 | Will ................................. | 29/235 |
| 6,049,960 A * | 4/2000 | Pilling et al. .................... | 29/450 |
| 6,444,913 B1 * | 9/2002 | Kao ................................ | 174/73.1 |

FOREIGN PATENT DOCUMENTS

| | | |
|---|---|---|
| CA | 705 309 | 3/1965 |
| DE | 33 34 836 | 7/1994 |
| WO | 2008046972 | 4/2008 |

OTHER PUBLICATIONS

Kukacka, Lawrence E. "Materials for Geothermal Production," Energy Efficiency and Conservation Division, Department of Applied Science. Brookhaven National Laboratory; presented at Geothermal Review X Conference, San Francisco, CA. Mar. 24-26, 1992 pp. 2-13.
"Technology Update: Tool Enables Boost in Brownfield Production," JPT online. Jan. 2006, 3 pages. Retrieved Jun. 12, 2008 from: http://www.spe.org/spe-app/spe/jpt/2006/01/tech_update.htm.
Miura, et al. "Evaluation of Polyaryl Adhesives in Elastomer-Stainless Steel Joints." Energy Efficiency and Conservation Division, Department of Applied Science. Brookhaven National Laboratory, Upton, Long Island, NY. Oct. 1992. pp. iii-24.
International Search Report with Written Opinion, PCT/US2008/066889, Date Mailed Sep. 16, 2008, Search Report having 6 pages, Written Opinion having 5 pages.

* cited by examiner

*Primary Examiner* — Lee D Wilson
*Assistant Examiner* — Shantese McDonald
(74) *Attorney, Agent, or Firm* — Cantor Colburn LLP

(57) ABSTRACT

Disclosed herein is a method of installing an elastomeric element onto a tubular. The method includes, positioning the elastomeric element onto a radially expandable member, radially expanding the radially expandable member and the elastomeric element installed thereon, positioning a tubular coaxially with the radially expandable member, and axially urging the elastomeric element off the radially expandable member thereby allowing the elastomeric element to be positioned coaxially about an outer perimetrical surface of the tubular.

18 Claims, 4 Drawing Sheets

ELASTOMERIC ELEMENT INSTALLATION TOOL AND METHOD

CROSS REFERENCE TO RELATED APPLICATIONS

This application claims priority to U.S. Provisional Application No. 60/944,170, filed on Jun. 15, 2007, the entire contents of which are incorporated herein by reference.

BACKGROUND OF THE INVENTION

The hydrocarbon recovery industry often has a need to seal one downhole tubular within another tubular. Sealing arrangements comprising an elastomeric element are commonly used to form a seal between two tubulars. In some applications it is important to fixedly attach the elastomeric element to a mandrel around which it is supported so that the elastomeric element is resistant to axial dislocation or bunching during running of a string with the mandrel and elastomeric element downhole. One method of attaching the elastomeric element to the mandrel is through the use of an adhesive. Properly locating an adequate amount of the adhesive between an inner perimetrical surface of the elastomeric element and an outer surface of the mandrel can be difficult. One difficulty stems from the tendency of the elastomeric element to swab off the adhesive during installation of the elastomeric element to the mandrel. This is in part due to the elastomeric element having a smaller inside dimension of a bore therethrough than an outside dimension of the mandrel onto which it is installed and to the common method of installing the elastomeric element, which is by stretching the element onto the mandrel and then sliding the element to the desired location. Since the element is in tight contact with the mandrel, the adhesive is pushed off of the mandrel at the leading edge of the element. The industry would, therefore, be receptive to improved systems and methods of installing an elastomeric element to a mandrel.

BRIEF DESCRIPTION OF THE INVENTION

Disclosed herein is a method of installing an elastomeric element onto a tubular. The method includes, positioning the elastomeric element onto a radially expandable member, radially expanding the radially expandable member and the elastomeric element installed thereon, positioning a tubular coaxially with the radially expandable member, and axially urging the elastomeric element off the radially expandable member thereby allowing the elastomeric element to be positioned coaxially about an outer perimetrical surface of the tubular.

Further disclosed herein is an elastomeric element installation tool. The tool includes, an expandable member receptive of the elastomeric element while in an unexpanded configuration, an expansion member in operable communication with the expandable member to expand the expandable member upon engagement therewith, and a stripper for axially urging the elastomeric element off from the expandable member and onto a tubular.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of several embodiments of the disclosed apparatus and method are presented herein by way of exemplification and not limitation with reference to the Figures.

Figure 1:
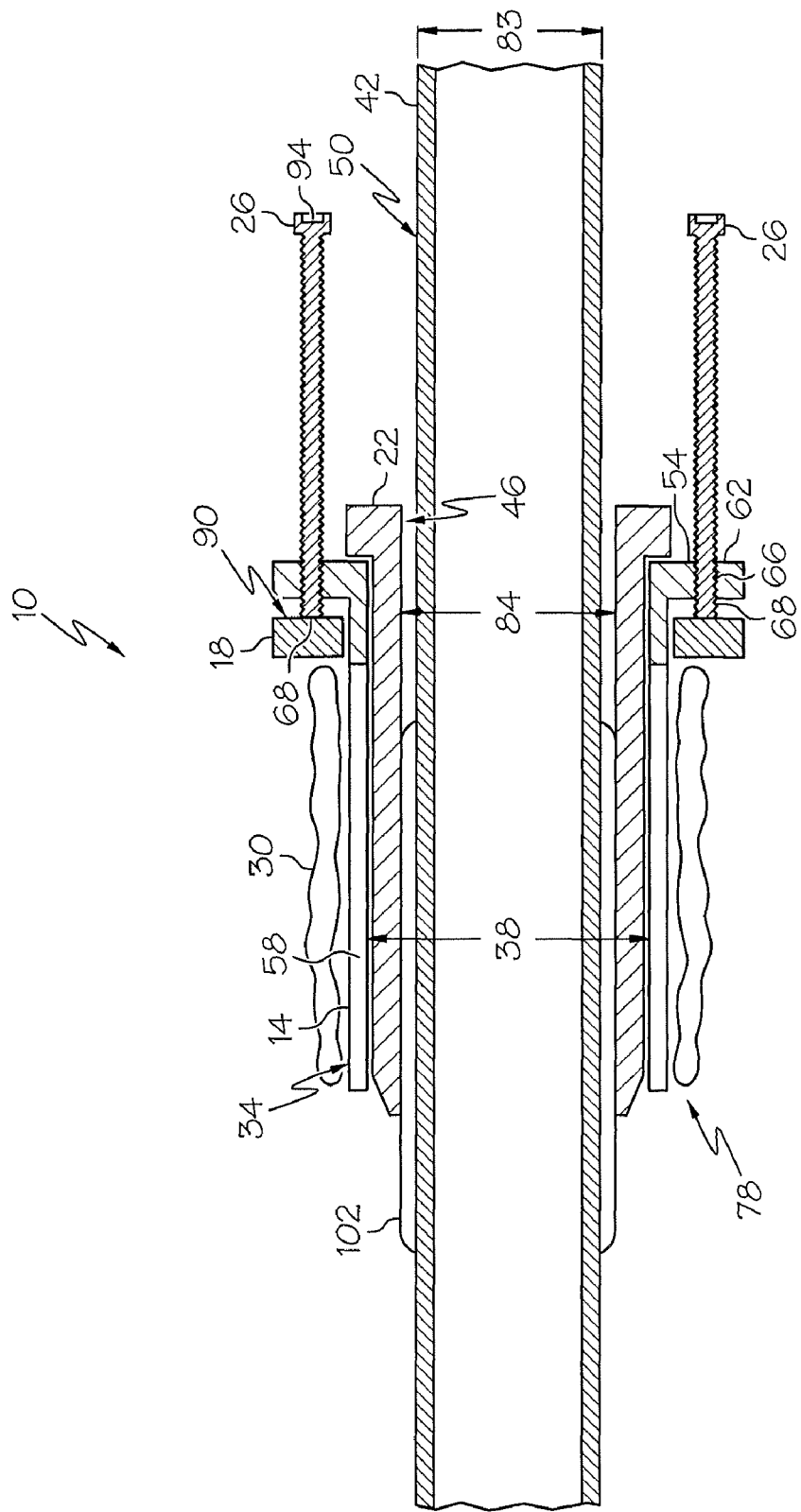
FIG. 1 depicts a cross sectional view of an elastomeric element installation tool described herein.

Referring to FIG. 1, an embodiment of the elastomeric element installation tool 10 disclosed herein is illustrated. The tool 10 includes, broadly introduced, a radially expandable member 14, a ring 18, an expansion mandrel 22 and a plurality of threaded rods 26 threadedly engaged with the radially expandable member 14. The radially expandable member 14 is receptive of the ring 18 and an elastomeric element 30 at an outer perimetrical surface 34 thereof. An inside dimension of the ring 18 is configured as a clearance fit with the member 14 however it is to be appreciated that the clearance is a narrow one. The radially expandable member 14 is also receptive of the expansion mandrel 22 at a reducible inside dimension 38 thereof. The tool 10 with the foregoing components assembled thereto is fittable over a target tubular 42 in a bore 46 through the tool 10. The tubular 42 may be a part of a string and is referred to herein alternately as a tubular or a mandrel. The mandrel 42 is thereby positioned radially inwardly of the elastomeric element 30, which for example, may be a sealing member. In one embodiment the element 30 comprises a swellable material, swellably responsive to at least one of water, methane, and oil. The ring 18 is axially movable relative to the radially expandable member 14 such that axial movement of the ring 18 can push the element 30 from the radially expandable member 14. The elastic nature of the element 30 causes the element 30 to radially contract about an outer perimetrical surface 50 of the tubular 42.

Figure 2:
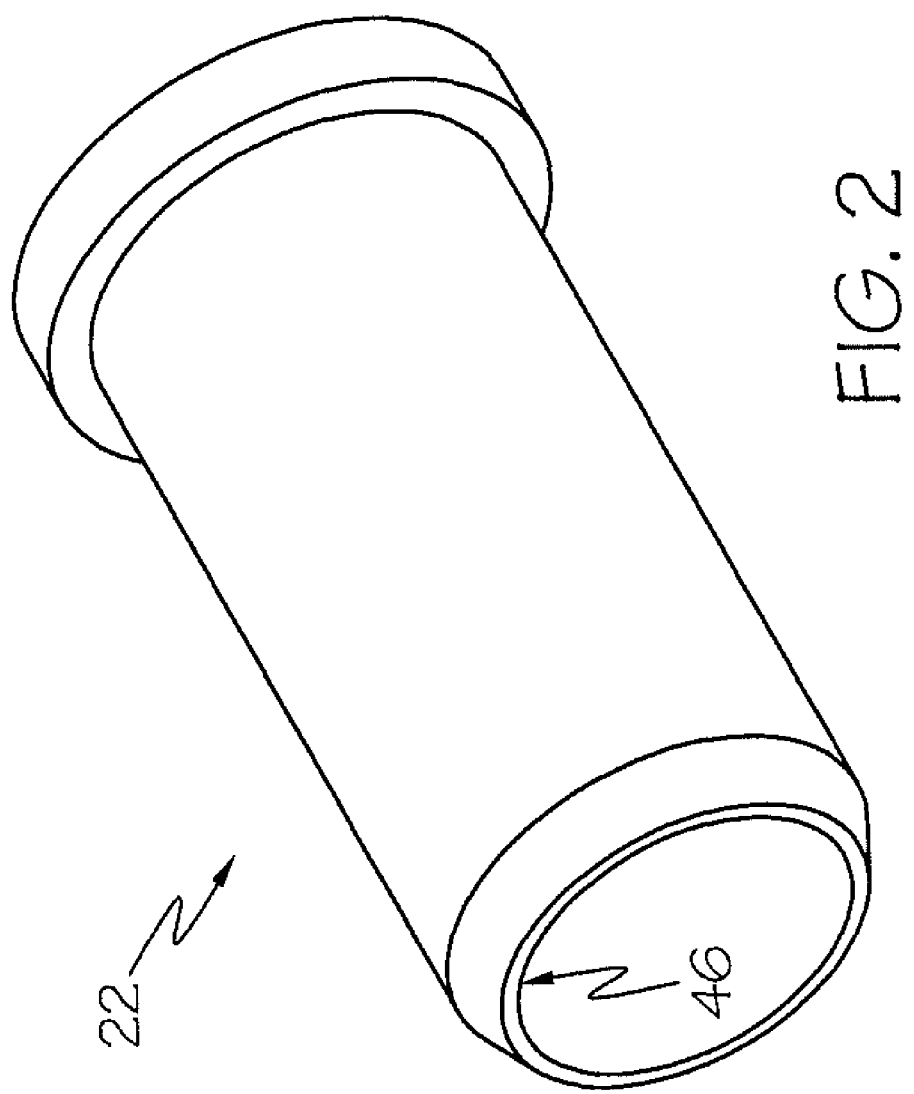
FIG. 2 depicts a perspective view of an expansion mandrel disclosed herein.

Referring to FIG. 2, the expansion mandrel 22 is illustrated in perspective view. The expansion mandrel 22 comprises a rigid material such as metal that is sufficiently dimensionally stable to allow it to be utilized as a ram. The function of the expansion mandrel 22 as a ram is related directly to the expansion of the element 30 and will become apparent in the paragraphs below.

Figure 3:
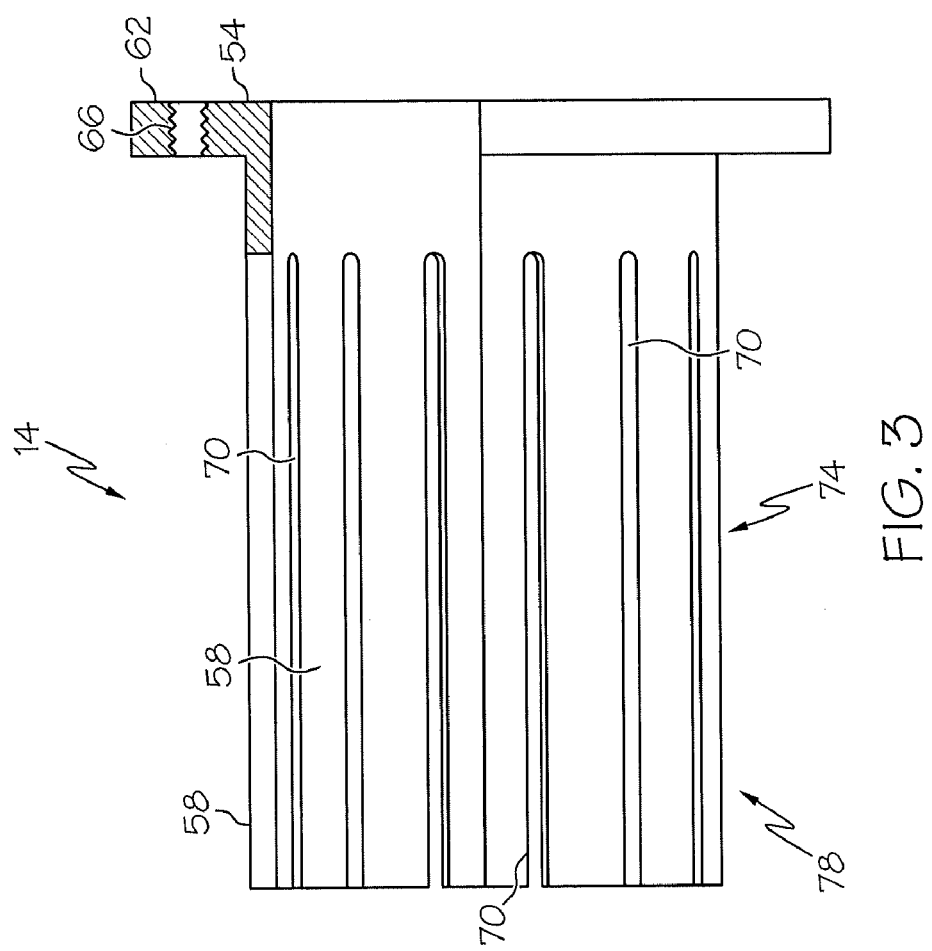
FIG. 3 depicts a one-quarter cross sectional view of the radially expandable member disclosed herein.

Referring to FIG. 3, the radially expandable member 14 is made of a rigid material such as metal, for example. The expandable member 14 in one embodiment, and as illustrated, has an annularly shaped hub 54 with a plurality of fingers 58 extending axially therefrom. Extending radially outwardly of the hub 54 is a flange 62 with a plurality of axially threaded holes 66 therethrough. The threaded holes 66 are receptive of the threaded rods 26 noted above, and are distributed at approximately equal angles about the flange 62. Threaded holes 66 are provided in order that a force may be generated on the ring 18 with ends 68 of the threaded rods 26, which incidentally may be bolts, lead screws, ball screws or other similar types of rotary to linear force generators. Notably, the force generators could also be linear generators such as solenoid actuators, hydraulic or pneumatic rams, etc., if desired for particular applications.

The fingers 58, as shown in this embodiment, are produced through a machining process by cutting a plurality of slots 70 into an annular or other shaped tubular body 74 of the radially expandable member 14. In another embodiment, the fingers are produced by attaching individual formed pieces to the hub 54 by a fixation process, such as, welding, for example. Regardless of the fabrication process selected, the slots 70 extend from a more dimensionally stable end of the body 74, adjacent to the hub 54, to a more flexible end 78 of the body 74. As such, the radially expandable member 14 resembles a collet and in some embodiments may actually be a collet. The fingers 58 of the body 74 are radially deflectable so that the body 74 may be relatively easily distorted into a frustoconical shape. The frustoconical shape enables a user to dispose an element 30 over the more flexible end 78 of the body 74 by inserting the smaller end of the frustocone into the inside dimension of the element 30. While the fingers 58 have been illustrated in this embodiment as having a shape of individual arc lengths of an annulus, it is noted that the fingers 58 might have alternate shapes such as round, as in rods, or flat, as in slats, for example.

Figure 4:
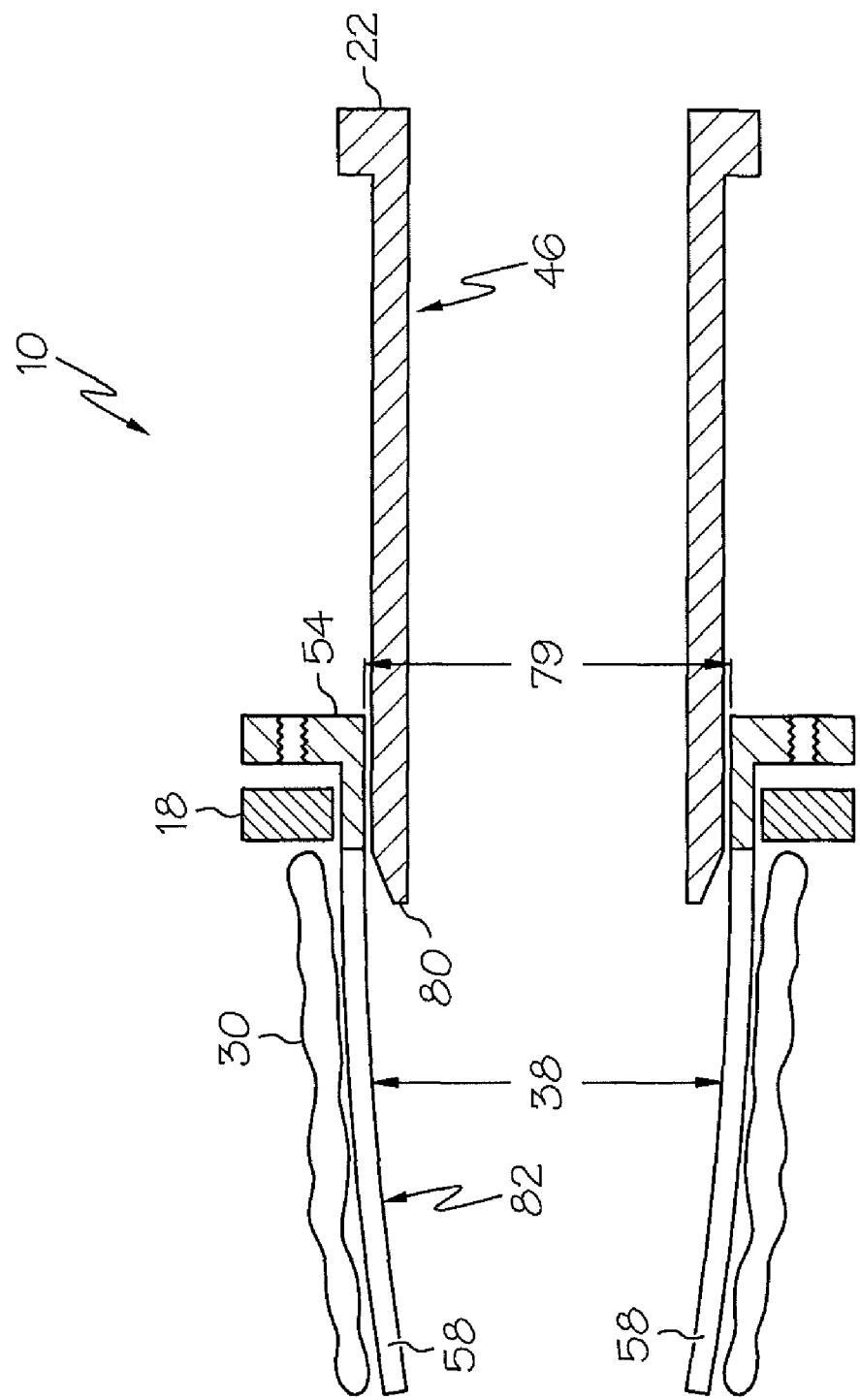
FIG. 4 depicts a cross sectional view of the elastomeric element installation tool of FIG. 1 in a partially expanded configuration.

Referring to FIG. 4, it should be appreciated that the expansion mandrel 22, while being freely insertable into the hub 54 due to its unchanging inside dimension 79, will not fit freely into the distorted reduced inside dimension 38 of the fingers 58. Rather an end 80 of expansion mandrel 22 will make contact with the inside surface 82 of the fingers 58 of the radially expandable member 14. The end 80 is, in one embodiment, itself frustoconically shaped to reduce resistance to the expansion mandrel 22 moving into the radially expandable member 14. The expansion mandrel 22 may be forced into the radially expandable member 14 in a number of ways including manually by lifting the arrangement and slamming it down on the floor several times, or by utilizing a mechanism capable of generating a compressive force on the arrangement. As the expansion mandrel 22 continues to move into a radially inwardly nested position with the radially expandable member 14, the fingers 58 are urged radially outwardly thereby also urging radially outwardly the element 30 (and then keeping the element 30 in the expanded condition until removal from the tool 10). Thus, use of the element installation tool 10 causes the element 30 to be expanded radially to a diameter (cylindrical embodiment) larger than the outside dimension 83 of the outside surface 50 of the mandrel or tubular 42 so that the tool 10, with the element 30 thereon, may be moved along the mandrel or tubular 42 while not being in direct in contact therewith. In other words, the tool 10 is overall larger in its inside dimension 84 than the mandrel 42 is at its outside dimension 83. The element may thus be positioned radially outwardly of a section of mandrel 42, to which has been applied an adhesive, without disturbing the adhesive in any way Subsequent to the positioning of the element 30 at the desired location of the mandrel 42, the element 30 may be pushed off of the radially expandable member 14 by the ring 18 with impetus from threaded rods 26. The pushing of the element 30 is accomplished by rotating the threaded rods 26 in a direction to cause the length of the threaded rod positioned between the flange 62 and the ring 18 to grow. In one embodiment, this direction will be clockwise as threaded rods 26 are commonly available in a right hand thread. Left hand threads may of course be substituted if desired without change in effect of the tool 10. Upon the lengthening of the threaded rods 26 between the flange 62 and the ring 18, the ring is urged toward an end 78 of the body 74 opposite the hub 54. Since the clearance of the ring 18 with the fingers 58 is small, the ring 18 contacts the element 30 and moves the element 30 axially away from the hub 54. In this embodiment the ring 18 is moved away from the hub 54 in response to ends 68 of threaded rods 26 pushing against a surface 90 of the ring 18. The threaded rods 26 move relative to the hub 54 due to rotation of the threaded rods 26 and the engagement of the threaded rods 26 with the threaded holes 66 in the flange 62. The threaded rods 26 may be rotated automatically or manually with a plurality of wrenches (not shown), which engage with hex head ends 94 of the threaded rods 26, for example. At least two threaded rods 26 should be employed to assure that the surface 90 is maintained in an approximate perpendicular orientation relative to an axis of the tool 10 to uniformly push the element 30 from the tool 10. More than two threaded rods 26 will improve control during the movement of the ring 18 as long as the threaded rods 26 are rotated in unison.

As the element 30 moves off the end 78 of the radially expandable member 14, it will naturally contract, seeking its unexpanded inside dimension. This ensures that the element 30 will move into contact with the mandrel or tubular 42 in a substantially radial only direction thereby avoiding swabbing of an adhesive previously applied to the tubular 42. In order for the element 30 to optimally achieve the desired motion, it is desirable that the tool 10 be located substantially coaxially with the mandrel 42 at least at the end 78 of the radially expandable member 14. Additionally, it is intended that the element 30 remain axially stationary while being pushed off the end 78 for the same purpose of avoiding swabbing off the adhesive. This can be accomplished by moving the expansion mandrel 22 and the radially expandable member 14 together (rightward in as viewed in FIG. 1) while maintaining the tubular 42, the ring 18 and the element 30 stationary (or moving but relatively stationary with respect to the just identified moving parts). Alternately, the expansion mandrel 22 and the radially expandable member 14 can be held stationary while moving the tubular 42, ring 18 and the element 30 (leftward in this view). Which of the parts is actually moving is not important, but the relative motion of them is important. In either case, the tool 10 effectively substantially eliminates any relative axial motion between the tubular 42 and the element 30. Such relative movements as noted can be controlled by a mechanism (automatically) or manually. Protection of an adhesive 102 facilitates improved adhesion between the element 30 and the tubular 42 thereby improving retention of the element 30, in a desired position along the outer perimetrical surface 50 of tubular 42, during running a well bore.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of installing an elastomeric element onto a tubular, comprising:
   positioning the elastomeric element onto a radially expandable member;
   engaging the radially expandable member with an expansion member;
   radially expanding the radially expandable member and the elastomeric element installed thereon with the engaging of the expansion member;
   positioning the tubular coaxially with the radially expandable member; and axially urging the elastomeric element off the radially expandable member thereby allowing the elastomeric element to be positioned coaxially about an outer perimetrical surface of the tubular.

2. The method of claim 1, further comprising applying adhesive to the outer perimetrical surface of the tubular prior to positioning the elastomeric element thereon.

3. The method of claim 1, wherein the radial expansion of the radially expandable member further comprises urging a mandrel into an inner radial bore thereof.

4. The method of claim 1, wherein the axially urging of the elastomeric element further comprises axially moving a ring relative to the radially expandable member thereby stripping the elastomeric element from the radially expandable member.

5. The method of claim 4, wherein the axial movement of the ring further comprises rotating a plurality of threaded rods threadably engaged with the radially expandable member such that the plurality of threaded rods move relative to the radially expandable member and cause the axial movement of the ring relative to the radially expandable member.

6. The method of claim 1, wherein the positioning the tubular further comprises moving the tubular in unison with axial movement of the ring to substantially eliminate relative axial movement of the elastomeric element with the tubular during installation of the elastomeric element to the tubular.

7. The method of claim 1, wherein the axially urging further comprises radially reducing the elastomeric element about the tubular.

8. The method of claim 1, further comprising adhering the elastomeric element to the tubular.

9. An elastomeric element installation tool, comprising:
an expandable member receptive of an elastomeric element while in an unexpanded configuration, the expandable member including a hub with a plurality of fingers extending axially therefrom and being receptive of the elastomeric element at an outer perimeter defined by the plurality of fingers;
an expansion member in operable communication with the expandable member to expand the expandable member upon engagement therewith, the expansion member including a mandrel axially slidably engagable within an inner bore of the expandable member such that axial engagement of the mandrel within the inner bore causes a radial outward expansion of at least a portion of the plurality of fingers; and
a stripper for axially urging the elastomeric element off from the expandable member and onto a tubular.

10. The elastomeric element installation tool of claim 9, wherein the stripper includes a ring slidably engagable with the outer perimeter such that axially sliding the ring relative to the expandable member causes the elastomeric element positioned thereon to strip off an axial end of the expandable member.

11. The elastomeric element installation tool of claim 10, further comprising a plurality of threaded rods threadably engaged with a plurality of axially threaded bores in the hub and ends of each of the plurality of threaded rods being contactable with a surface of the ring such that the ring is axially urged away from the hub in response to rotation of the plurality of threaded rods.

12. The elastomeric element installation tool of claim 11, wherein the plurality of threaded rods are ball screws.

13. The elastomeric element installation tool of claim 10, wherein the plurality of fingers of the expandable member are welded to the hub.

14. The elastomeric element installation tool of claim 10, wherein the mandrel has an inner borehole receptive of the tubular such that the elastomeric element can be stripped off the expandable member onto the tubular positioned within the inner borehole of the mandrel.

15. The elastomeric element installation tool of claim 14, further comprising a tubular feeding mechanism for moving the tubular through the inner borehole of the mandrel at a speed substantially equal to a speed of the axial sliding of the ring relative to the expandable member.

16. The elastomeric element installation tool of claim 9, wherein the expandable member is a collet.

17. The elastomeric element installation tool of claim 9, wherein the inner bore has a radial dimension that is larger at locations near to the hub than at locations further from the hub.

18. The elastomeric element installation tool of claim 9, wherein the expandable member is metal.

* * * * *